(12) United States Patent
Johnson et al.

(10) Patent No.: US 12,735,072 B1
(45) Date of Patent: Sep. 15, 2026

(54) ASSESSING DRIVING PLANS FOR AUTONOMOUS VEHICLES

(71) Applicant: Waymo LLC, Mountain View, CA (US)

(72) Inventors: Leif Morgan Johnson, Bolinas, CA (US); Johan Engstrom, Los Gatos, CA (US); Azadeh Dinparastdjadid, Sunnyvale, CA (US); Isaac John Supeene, Sunnyvale, CA (US)

(73) Assignee: Waymo LLC, Mountain View, CA (US)

( * ) Notice: Subject to any disclaimer, the term of this patent is extended or adjusted under 35 U.S.C. 154(b) by 129 days.

(21) Appl. No.: 18/614,428

(22) Filed: Mar. 22, 2024

Related U.S. Application Data

(60) Provisional application No. 63/454,012, filed on Mar. 22, 2023.

(51) Int. Cl.
*B60W 60/00* (2020.01)

(52) U.S. Cl.
CPC ..... *B60W 60/0027* (2020.02); *B60W 2552/15* (2020.02); *B60W 2552/20* (2020.02); *B60W 2552/40* (2020.02); *B60W 2554/20* (2020.02); *B60W 2554/4046* (2020.02); *B60W 2555/60* (2020.02)

(58) Field of Classification Search
CPC ......... B60W 60/0027; B60W 2552/15; B60W 2552/20; B60W 2552/40; B60W 2554/20; B60W 2554/4046; B60W 2555/60
See application file for complete search history.

(56) References Cited

U.S. PATENT DOCUMENTS

2022/0317694 A1* 10/2022 Di Cairano ............ G05D 1/617
2023/0055974 A1* 2/2023 Arnold ............... G01C 21/3461
2023/0391373 A1* 12/2023 Di Cairano ............ G08G 1/163

OTHER PUBLICATIONS

Althoff et al., "Online verification of automated road vehicles using reachability analysis," IEEE Transactions on Robotics, Apr. 8, 2014, 30(4):903-18.
Bajcsy et al., "Analyzing Human Models that Adapt Online," CoRR, submitted on Mar. 9, 2021, arXiv:2103.05746v2, 8 pages.
Bruineberg et al., "Free-energy minimization in joint agent-environment systems: A niche construction perspective," Journal of Theoretical Biology, Oct. 14, 2018, 455:161-178.
Chemero, "An Outline of a Theory of Affordances," Ecological Psychology, Dec. 7, 2018, p. 181-195.
Clark, "Whatever Next? Predictive Brains, Situated Agents, and the Future of Cognitive Science," Behavioral and Brain Sciences, Jun. 2013, 36(3): 181-204.
Damasio et al., "Descartes' Error: Emotion, Reason, and the Human Brain," New York: Putnam, 1994, p. 350-352 (abstract only).
(Continued)

*Primary Examiner* — David P. Merlino
(74) *Attorney, Agent, or Firm* — Fish & Richardson P.C.

(57) ABSTRACT

Methods, systems, and apparatus, including computer programs encoded on computer storage media, for assessing driving plans for autonomous vehicles. One of the methods includes obtaining data representing a goal for an agent in a driving environment, generating one or more available trajectories for the agent, and selecting one or more future actions for the agent.

21 Claims, 7 Drawing Sheets

(56) References Cited

OTHER PUBLICATIONS

Engström et al., "Great expectations: a predictive processing account of automobile driving," Theoretical Issues in Ergonomics Science, Mar. 4, 2018, 19(2): 156-194.
Feldman et al., "Attention, Uncertainty, and Free-Energy," Frontiers in Human Neuroscience, Dec. 2, 2010, 4:215.
Fraade-Blanar et al., "Measuring Automated Vehicle Safety," Forging a Framework, RAND corporation, Oct. 11, 2018, 91 pages.
Friston et al., "Active Inference and Epistemic Value," Cognitive Neuroscience, Mar. 13, 2015, 6(4): 187-214.
Friston et al., "Active Inference: A Process Theory," Neural Computation, Jan. 1, 2017, 29(1):1-49.
Friston et al., "Free-Energy Minimization and the Dark-Room Problem," Frontiers in Psychology, May 8, 2012, 3:130.
Friston, "The Free-energy Principle: A Unified Brain Theory?" Nature Reviews Neuroscience, Feb. 2010, 11(2): 127-138.
Fuller, "Towards a general theory of driver behaviour," Accident Analysis and Prevention, May 1, 2005, 37(3):461-72.
Gibson et al., "A theoretical field-analysis of automobile-driving," The American journal of psychology, Jul. 1, 1938, 51(3):453-71 (abstract only).
Herbert, "Safe Real-World Autonomy in Uncertain and Unstructured Environments," University of California, Berkeley, Aug. 13, 2020, 232 pages.
Itti et al., "Bayesian surprise attracts human attention," Vision Research, Jun. 2, 2009, 49(10):1295-1306.
Kujala, "Attentional Demand of Driving as Uncertainty in Predictive Processing," In Book of Abstracts for the 6th International Conference on Driver Distraction and Inattention 2018, p. 19-23.
Lewis-Evans, "Testing Models of Driver Behaviour," Thesis for the degree of Doctor, University of Groningen, Oct. 2012, 207 pages.
Ljung et al., "A conceptual framework for requirement specification and evaluation of active safety functions," Theoretical Issues in Ergonomics Science, Jan. 1, 2011, 12(1):44-65 (abstract only).
Manzinger et al., "Using Reachable Sets for Trajectory Planning of Automated Vehicles," IEEE Transactions on Intelligent Vehicles, Aug. 18, 2020, 6(2):232-48.
Parr et al., "Uncertainty, epistemics and active inference," Journal of the Royal Society Interface, Nov. 30, 2017, 14(136):20170376.
Pek et al., "Using online verification to prevent autonomous vehicles from causing accidents," Nature Machine Intelligence, Sep. 2020, 2(9):518-28.
Pekkanen et al., "A computational model for driver's cognitive state, visual perception and intermittent attention in a distracted car following task," Royal Society Open Science, Sep. 5, 2018, 5(9): 180194.
Piccinini et al., "How Do Drivers Respond to Silent Automation Failures? Driving Simulator Study and Comparison of Computational Driver Braking Models," Human Factors, Nov. 2020, 62(7):1212-29.
Ranney, "Models of driving behaviour: A review of their evolution," Accident Analysis and Prevention, Dec. 1, 1994, 26(6):733-750.
Schwarting, "Social behavior for autonomous vehicles," Proceedings of the National Academy of Sciences, Dec. 10, 2019, 116(50):24972-8.
Shalev-Shwartz et al., "On a Formal Model of Safe and Scalable Self-driving Cars," CoRR, submitted on Aug. 21, 2017, arXiv:1708.06374v6, 37 pages.
Summala, "Risk Control is Not Risk Adjustment: The Zero-Risk Theory of Driver Behaviour and its Implications," Ergonomics, Apr. 1, 1988, 31(4): 491-506.
Summala, "Towards understanding motivational and emotional factors in driver behaviour: Comfort through satisficing," Modelling driver behaviour in automotive environments: Critical issues in driver interactions with intelligent transport systems, 2007:189-207.
Vaa, "Modelling driver behaviour on basis of emotions and feelings: intelligent transport systems and behavioural adaptations," In Modelling driver behaviour in automotive environments: critical issues in driver interactions with intelligent transport systems, Jan. 2007, p. 208-232.
Vanholme et al., "Highly Automated Driving on Highways based on Legal Safety," IEEE Transactions on Intelligent Transportation Systems, Nov. 26, 2012, 14(1):333-47 (abstract only).
Vinkhuyzen et al., "Developing Socially Acceptable Autonomous Vehicle," In Ethnographic Praxis in Industry Conference Proceeding, Nov. 2016, p. 522-534.
Wilde, "The theory of risk homeostasis: Implications for traffic safety and health," Risk Analysis, Dec. 1982, 2(4):209-225 (abstract only).

* cited by examiner

ASSESSING DRIVING PLANS FOR AUTONOMOUS VEHICLES

CROSS-REFERENCE TO RELATED APPLICATION

This application claims priority to U.S. Provisional Application No. 63/454,012, filed on Mar. 22, 2023. The disclosure of the prior application is considered part of and is incorporated by reference in the disclosure of this application.

BACKGROUND

This specification relates to autonomous vehicles and techniques for performing assessments for the actions of various agents.

Autonomous vehicles can include autonomously driven cars (including buses, trucks, etc.), boats, and aircraft. Autonomous vehicles use a variety of on-board sensors and computer systems to detect nearby objects and use such detections to make control and navigation decisions.

Fully autonomous driving by an autonomously driven vehicle (ADV), sometimes referred to as a self-driving car, has been a difficult and complex technical problem to solve. Part of the complexity stems from the fact that simply knowing current traffic laws, reliably detecting other vehicles and pedestrians, and being able to control the vehicle to high degrees of precision are still often not enough to achieve fully autonomous driving. For example, other vehicles and pedestrians, and road conditions, may move or change quickly or unexpectedly.

SUMMARY

This specification describes how a system can select a driving plan that includes one or more future actions for an agent, also referred to as the ego agent, that accounts for uncertainty in the environment and progress towards a goal. In this specification, an agent can be any appropriate entity in a driving environment capable of moving independently. Thus, an agent can be an autonomously driven vehicle or semi-autonomously driven vehicle (ADV) in the real world or in a simulation. An agent can also be other cars, cyclists, pedestrians, and animals, to name just a few examples. The system can be used in both offline and online scenarios. In other words, the techniques described below can be used for online operations, e.g., planning and driving decisions; and for offline analysis of simulated or previously recorded agent behaviors; or both.

In this specification, a trajectory refers to a future sequence of actions to be taken by an agent toward a goal. Commonly, the trajectory represents a particular path through a driving environment that the agent endeavors to adhere to by controlling physical systems of a vehicle that govern speed and steering. The actions of a trajectory need not be specified explicitly. Rather, the actions can be generated at each time step as an agent seeks to adhere to a selected trajectory. A policy is a sequence of actions that implements a trajectory.

Thus, in this specification, selecting a trajectory can refer to selecting a particular path through a driving environment to which an agent should follow, optionally with control characteristics or other features. Similarly, generating a trajectory can refer equally to generating actions required to follow a particular path through a driving environment, i.e., selecting one or more actions from among a plurality of actions that implement a trajectory.

Using the techniques described in this specification, a system can generate trajectories for the ego agent in the driving environment that are effectively encompassed by a field of safe motion (FSM) for the ego agent. In this specification, a field of safe motion refers to an area that encompasses a set of candidate trajectories towards a goal that are available to the ego agent. Using the trajectory generation and selection techniques described in this specification, a field of safe motion will be influenced by a computed representation of the ego agent's current belief about the state of the environment according to sensor data, as well as the certainty of that belief. The field of safe motion can also be influenced by the action capabilities of the ego agent, e.g., how fast the ego agent can accelerate or decelerate, as well as the perception capabilities of the ego agent, e.g., sensors installed and capabilities of the sensors.

In some examples, the state of the environment for the field of safe motion takes into consideration occupancy fields of other agents in the driving environment, where an occupancy field refers to the set of possible future locations of an agent. The field of safe motion can change continuously as the ego agent and other agents move. The field of safe motion can also be constrained by additional constraints such as norms and laws of the driving environment. Particular embodiments of the subject matter described in this specification can be implemented so as to realize one or more of the following advantages.

The system can provide an understanding or model of safe driving at a given point in time. For example, the system can select a desirable trajectory for an ego agent given assumptions about the ego agent, the environment, and/or other agents. The desirable trajectory can balance safety with making forward progress, for example. The system can take into account the different capabilities of different agents, such as braking, swerving, and accelerating abilities of passenger vehicles, bicycles, or trucks.

The system can provide driving plans for defensive driving that prioritize safety. For example, the system can select a trajectory that avoids the occupancy field of another agent. In addition, the system can determine that there is no trajectory that avoids the occupancy field of other agents, and execute a defensive adjustment. For example, the system can pause movement of the ego agent. As another example of a defensive adjustment, the ego agent can slow down to increase the distance to the other agent.

The system can also provide driving plans that take into account social norms and road rules. For example, the possible trajectories can be constrained by norms of the driving environment, such as trajectories that are legally or socially acceptable.

The system can provide for flexible responses to situations. For example, the system can define safety as avoiding all crashes, or avoiding crashes of certain severity. The system can also take into account preferences such as comfort when selecting a driving plan. Furthermore, in situations where the system does not have enough information to select a driving plan, the system can pause movement of the agent. The system can also select a driving plan for the agent that allows the agent to obtain more relevant information (e.g., by performing an epistemic action) which may potentially create, or enlarge the existing, field of safe motion as the system generates more trajectories that are likely to be within the field of safe motion.

The system can select a driving plan for an agent using current and relevant information from the agent's surroundings, providing an up-to-date driving plan for the agent at a given point in time. For example, the system can use the field of safe motion to select a driving plan. The trajectories within the FSM can be determined by, for example, information about the environment, action capabilities of the agent, perceptual capabilities of the agent, etc. The system can select a driving plan based on a trajectory that optimizes between progress and caution in order to perform maneuvers such as negotiating a curve, overtaking a cyclist, moving past a double parked vehicle, or interacting with a pedestrian, for example. For example, the system can select a trajectory that is optimized between an epistemic value that represents the degree of information to be gained about the current situation and a pragmatic value that represents the degree to which the agent will advance toward the goal. An action with epistemic value allows the agent to obtain more information to open up the field of safe motion. Selecting a trajectory that is optimized between the epistemic value and pragmatic value results in a better or safer action, for example. For example, the system can use active inference to select the optimized trajectory through the minimization of expected free energy, which can be expressed as a function of epistemic and pragmatic value.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
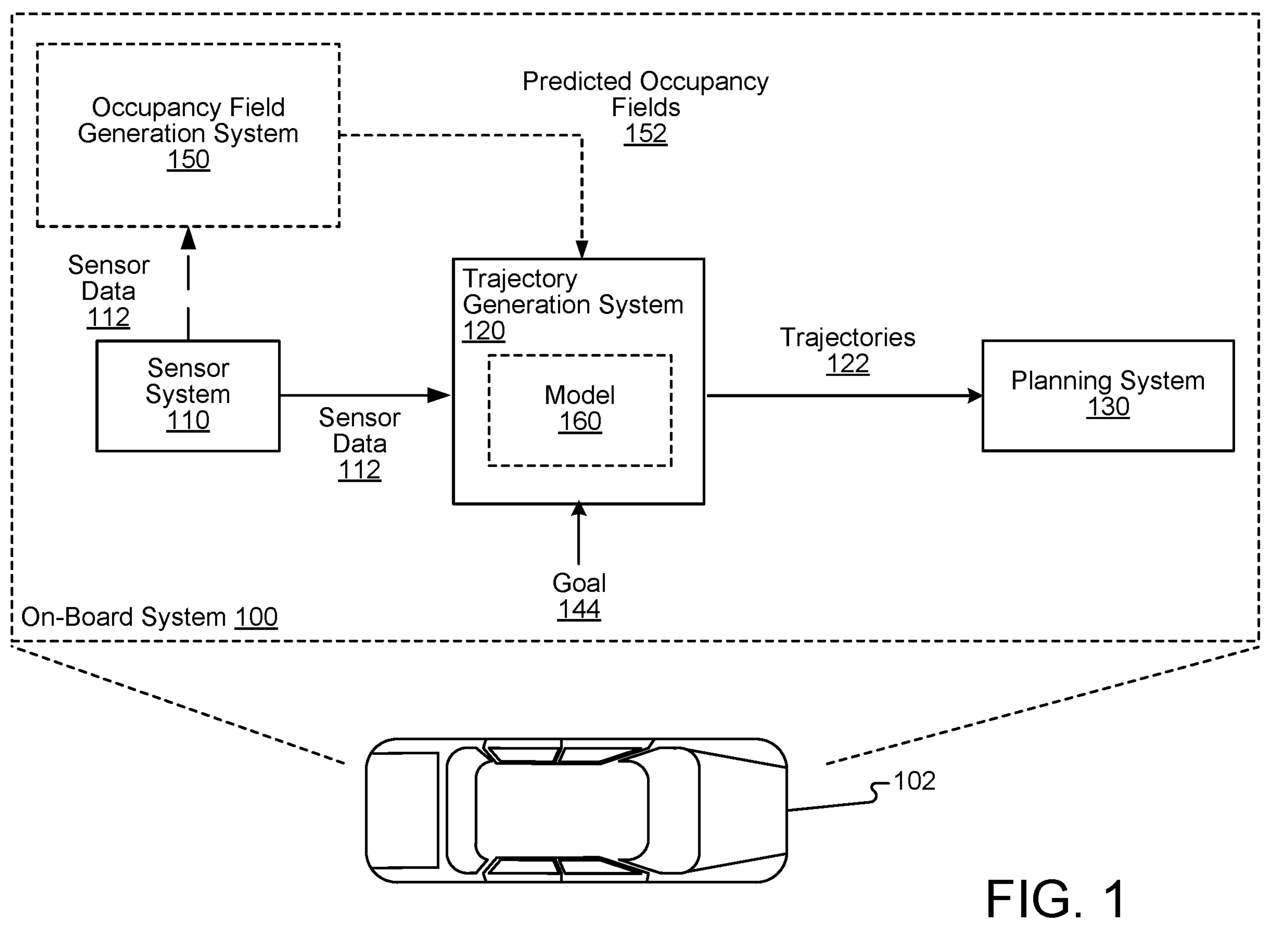
FIG. 1 is a diagram of an example system.

This specification describes how a vehicle, e.g., an autonomous or semi-autonomous vehicle, can select a driving plan by computing trajectories that are likely to attain a goal for the vehicle.

The trajectories are likely to lie within a field of safe motion (FSM). In a completely predictable and observable environment, the trajectories within the FSM can be fully determined by factors such as the road geometry, the location of static obstacles, the predicted paths or occupancy fields of other road users, the ego agent's action capabilities, road rules, and other social norms. However, in an uncertain environment such as real-world road navigation, the FSM is influenced by the estimated uncertainty of the current situation (e.g., uncertainty in the future location of other agents resulting in wide occupancy fields). For example, the system can use a model, such as a generative model, to estimate uncertainty. In this case, the ego agent can perform epistemic actions (e.g., looking around a corner, checking the rearview mirror, performing test braking to probe the road surface condition) to reduce the uncertainty and thus enable an FSM towards the destination. In practice, control actions (e.g., moving past an occluding object) can serve both pragmatic (making progress, achieving one's goals) and epistemic (gather more information, reduce uncertainty) purposes. Thus, epistemic and pragmatic actions are seamlessly intertwined in generating movement towards a goal.

Thus, a single movement action (e.g., taking a wider turn to get a better view around a corner) or sequence of actions could have both epistemic and pragmatic value. The weight of the epistemic value over the pragmatic value in deciding which trajectory to choose is determined by the degree of uncertainty in the situation. In the extreme case of a completely predictable situation (no uncertainty) there is nothing to be gained from gathering more information and the epistemic value carries zero weight. In this situation, pragmatic value can have 100% weight in selecting the trajectory. Conversely, if the situation is completely unpredictable (i.e., a large occupancy field and no FSM), pragmatic value can have zero weight and epistemic value can have 100% weight (i.e., it will not be possible to move at all without first gathering more information to open up the FSM). Most situations are on the continuum between these extremes.

The optimal trajectory given the subjective estimation of uncertainty by the agent's generative model (reflected in the size of the occupancy fields of other agents) can be determined by minimizing expected free energy.

Thus, epistemic and pragmatic action is often closely intertwined or even associated with the same action. For example, an action can have an epistemic value and a pragmatic value. A pragmatic action is an action having a maximum pragmatic action among candidate actions. An epistemic action is an action having a maximum epistemic value among candidate actions, where the epistemic action results in increasing the FSM more than other candidate actions.

An action can be one of multiple actions that executes a trajectory. For example, the candidate actions can each be the first actions of multiple trajectories. Each candidate action can have a pragmatic value and an epistemic value. In some examples, there may be no trajectories in the field of safe motion, and an action can be purely information seeking (i.e., with only epistemic value) such as checking the mirror, or a defensive adjustment.

Each trajectory can also have a pragmatic value and an epistemic value derived from the pragmatic and epistemic values for the action(s) of the trajectory. For example, each trajectory can have a score based on the pragmatic value and the epistemic value for the trajectory. As an example, the score can be the negative sum of the pragmatic and epistemic value for the trajectory.

The trajectories can be determined at each timestep, for a certain future window of time. In some implementations, upon determining that there are no trajectories in a field of safe motion within a future window of time, the system can perform a defensive adjustment. For example, the agent can pause movement, slow down, or increase the distance from another agent.

FIG. 1 is a diagram that illustrates an example on-board system 100. The on-board system 100 is an example of a system that can implement the driving plan selection techniques described in this specification.

The on-board system 100 is composed of hardware and software components, some or all of which are physically located on-board a vehicle 102. The vehicle 102 is an example ego agent. The vehicle 102 in FIG. 1 is illustrated as an automobile, but the on-board system 100 can be located on-board any appropriate vehicle type. The vehicle 102 can be a fully autonomous vehicle that determines and executes fully-autonomous driving decisions in order to navigate through an environment. The vehicle 102 can also be a semi-autonomous vehicle that presents information to aid a human driver. For example, in response to determining that another vehicle in front of the vehicle 102 has stopped suddenly, the on-board system 100 may autonomously apply the brakes of the vehicle 102 or otherwise autonomously change the trajectory of the vehicle 102 to prevent a collision between the vehicle 102 and the other vehicle.

The on-board system 100 includes a sensor system 114 which enables the on-board system 100 to "see" the environment in the vicinity of the vehicle 102. More specifically, the sensor system 104 includes one or more sensors, some of which are configured to receive reflections of electromagnetic radiation from the environment in the vicinity of the vehicle 102. For example, the sensor system 110 can include lidar systems that detect reflections of laser light, radar systems that detect reflections of radio waves, and/or camera systems that detect reflections of visible light.

The sensor system 110 continually (i.e., at each of multiple time points) captures raw sensor data which can indicate the directions, intensities, and distances travelled by reflected radiation. For example, a sensor in the sensor system 110 can transmit one or more pulses of electromagnetic radiation in a particular direction and can measure the intensity of any reflections as well as the time that the reflection was received. A distance can be computed by determining the time which elapses between transmitting a pulse and receiving its reflection. Each sensor can continually sweep a particular space in angle, azimuth, or both. Sweeping in azimuth, for example, can allow a sensor to detect multiple objects along the same line of sight.

The system 100 provides the sensor data 112 to a trajectory generation system 120. The trajectory generation system 120 is configured to generate trajectories 122 for the agent in the driving environment towards a goal 144 that are encompassed by an FSM. The trajectory generation system 120 can generate the trajectories 122 within the FSM based on data derived from the sensor data 112 and the goal 144. For example, the trajectory generation system 120 can generate a representation of the current state of the vehicle 102, other agents in the environment, and/or the environment using the sensor data 112. The trajectory generation system 120 can generate the trajectories 122 within an FSM based on the current states and/or previous states.

The trajectory generation system 120 can generate trajectories 122 within an FSM based on data derived from the sensor data 112 such as road geometry, location of static obstacles, action capabilities of the agent, and/or perceptual capabilities of the agent. The trajectory generation system 120 can also generate trajectories 122 within the FSM based on data representing predicted occupancy fields for other agents, road rules, social norms, uncertainty in perceptual capabilities of the agent, uncertainty in action capabilities of the agent, or uncertainty in behaviors of other agents.

In some implementations, the trajectory generation system 120 includes a model 160. The model 160 is configured to generate a set of candidate trajectories for the agent given the sensor data 112. For example, the model 160 can be configured to generate a set of candidate trajectories given past states for the agent, predicted occupancy fields, and/or data representing current beliefs.

In some implementations, the trajectory generation system 120 generates trajectories 122 within an FSM that are constrained by other agents in the environment. For example, the model 160 can be a machine learning model that is trained to generate joint trajectories of multiple agents, such as of the vehicle 102 and another agent in the environment.

As another example, the trajectory generation system 120 can generate the trajectories 122 within the FSM by computing the set of kinematically possible trajectories available to the vehicle 102 given predicted occupancy fields 152. For example, the trajectory generation system 120 can determine a predicted occupancy field for the vehicle 102 as described below. The trajectory generation system 120 can eliminate trajectories from the FSM that overlap with predicted occupancy fields 152. The trajectory generation system 120 can output the remaining trajectories 122 within the FSM.

The on-board system 100 can obtain the predicted occupancy fields 152 and the occupancy field for the vehicle 102 from an occupancy field generation system 150. The occupancy field generation system 150 is configured to generate a predicted occupancy field for each agent in the environment in the vicinity of the vehicle 102, and for the vehicle 102. The occupancy fields 152 can represent the uncertainty in behaviors of agents by representing assumptions about future locations of each agent. The occupancy field generation system 150 can generate predicted occupancy fields 152 using a kinematic reachability analysis, i.e., using kinematic assumptions about the possible movements of the agents.

For example, the occupancy field generation system 150 can generate a predicted occupancy field at each of multiple timesteps. The predicted occupancy field for a timestep is represented as a set of agent states that are reachable at that timestep according to the kinematic capabilities of the agent. For example, each agent state can be represented as a node, and the set of agent states is represented as a convex hull including the nodes. The occupancy field generation system 150 can determine the set of agent states for future timesteps by constructing a reachability graph for the agent through time. For example, node A can correspond to a particular agent state at time A. Nodes B can correspond to agent states that are reachable at time B, the next timestep after time A, from node A. The system can recompute the convex hull to include the nodes B.

The occupancy field generation system 150 can determine the occupancy field from the reachability graph for a particular timestep by mapping from the set of agent states to the corresponding set of spatial coordinates for those states. For example, if an agent's state is represented by the center and orientation of its bounding box (x, y, θ), then that state may project onto planar space as the set of x-y coordinates contained within the bounding box. The overall occupancy field is the union of all occupancy sets from all agent states at a given time.

In some examples, the occupancy field generation system 150 can include a model that generates occupancy predictions such as a heatmap occupancy model or behavior prediction model. As an example, the heatmap occupancy model can generate a statistical occupancy prediction for each of one or more future timesteps given a set of observed agent occupancy sequences.

As an example, the behavior prediction model can generate a behavior prediction for a future trajectory of the agent given historical data about the past states of the agent, other agents in the environment, and/or features of the environment such as intersections, traffic signs, and lane markers, and current environment information, e.g., the current state of any traffic lights in the environment. The behavior prediction model can use any of a variety of multi-agent behavior prediction techniques such as applying likelihood models, motion planning algorithms, or both. The behavior prediction model can also be learned from data, e.g., the behavior prediction model can be trained to perform behavior prediction techniques. In some examples, the behavior prediction model can predict multiple candidate future trajectories for the agent and a respective likelihood score for each candidate future trajectory that represents the likelihood that the candidate future trajectory will be the actual future trajectory that is followed by the agent.

In some examples, the occupancy field generation system 150 can generate predicted occupancy fields 152 using a combination of the kinematic reachability analysis and outputs from a model. For example, the occupancy field generation system 150 can map occupancy predictions to a common coordinate system (e.g., the ground plane), and then compute an overall occupancy field prediction from the combination of the model predictions and kinematic reachability analysis at a given location.

For example, the occupancy field generation system 150 can use kinematic reachability analysis to compute an initial occupancy estimate. The occupancy field generation system 150 can use a heatmap occupancy model to narrow down kinematically possible occupancies to sites that are likely based on observed behavior, for example, as predicted by a model learned from data. The combination may result in more thorough and/or accurate predicted occupancy fields 152, in that the kinematic reachability analysis accounts for rare out-of-distribution events that are hard to learn from data (e.g., a cyclist cutting in front without warning) while the heatmap occupancy model accounts for uncertainty in actually observed behavior (e.g., a cyclist behaving erratically).

In some examples, the occupancy field generation system 150 can obtain information about agents, such as observed agent occupancy sequences and/or past states using sensor data 112. The on-board system 100 can use the sensor data 112 continually generated by the sensor system 110 to track the occupancy sequences and/or past states of agents (e.g., pedestrians, bicyclists, other vehicles, and the like) in the environment in the vicinity of the vehicle 102.

The past states of an agent can include data defining, for each of multiple time points, the spatial position occupied by the agent in the environment at the time point and characteristics of the motion of the agent at the time point. The characteristics of the motion of an agent at a time point can include, for example, the velocity of the agent (e.g., measured in miles per hour-mph), the acceleration of the agent (e.g., measured in feet per second squared), and the heading of the agent (e.g., measured in degrees). The heading of an agent refers to the direction of travel of the agent and can be expressed as angular data (e.g., in the range 0 degrees to 360 degrees) which is defined relative to a given frame of reference in the environment (e.g., a North-South-East-West frame of reference).

To track the past states of an agent in the environment in the vicinity of the vehicle 102, the on-board system 100 can maintain (e.g., in a physical data storage device) historical data defining the past states of the agent up to the current time point. The on-board system 100 can use the sensor data continually generated by the sensor system 104 to continually update (e.g., every 0.1 seconds) the historical data defining the past states of the agent. Generally, at a given time point, the historical data includes data defining: (i) the respective past states of agents in the vicinity of the vehicle 102, and (ii) the trajectory of the vehicle 102 itself, up to the given time point.

Historical data characterizing the trajectory of an agent can include any appropriate information that relates to the past state and current position of the agent. For example, the historical data can include, for each of multiple time points, data defining a spatial position in the environment occupied by the agent at the time point. For each time point, the historical data can further define respective values of each motion parameter in a predetermined set of motion parameters. The value of each motion parameter characterizes a respective feature of the motion of the agent at the time point. Examples of motion parameters include velocity, acceleration, and heading.

The on-board system 100 provides the trajectories 122 within the field of safe motion (FSM) to a planning system 130. Each trajectory in the FSM can include one or more actions.

The planning system 130 can use the trajectories 122 to make fully-autonomous driving decisions, i.e., to select a driving plan for the vehicle 102 based on the trajectories 122.

For example, the planning system 130 can determine which trajectory in the FSM is optimized between an epistemic value that represents the degree of information to be gained about the driving environment and a pragmatic value that represents the degree to which the agent will advance toward the goal, as described in more detail below with reference to FIG. 3.

As another example, if the FSM does not include any trajectories, the planning system 130 can determine to execute an epistemic action. For example, an epistemic action can include positioning the vehicle 102 relative to other agents, slowing down, moving to another lane, test braking, taking a wider turn around a corner, visually scanning the road scene, interacting with another agent, or waiting for more information.

As another example, the planning system 130 can use active inference to select a trajectory available in the FSM. The planning system 130 can select the optimized trajectory through the minimization of expected free energy, which can be expressed as a function of epistemic and pragmatic value as described with reference to FIG. 3.

The fully-autonomous driving plan selected by the planning system 130 can be implemented by a control system of the vehicle 102. For example, in response to receiving a fully-autonomous driving plan selected by the planning system 130 which includes an action that indicates the brakes of the vehicle should be applied, the control system may transmit an electronic signal to a braking control unit of the vehicle. In response to receiving the electronic signal, the braking control unit can mechanically apply the brakes of the vehicle.

The sensor system 110 can obtain new sensor data from the environment for a new timestep reflecting the action implemented by the control system, and generate new or updated trajectories 122 for the new timestep.

Figure 2:
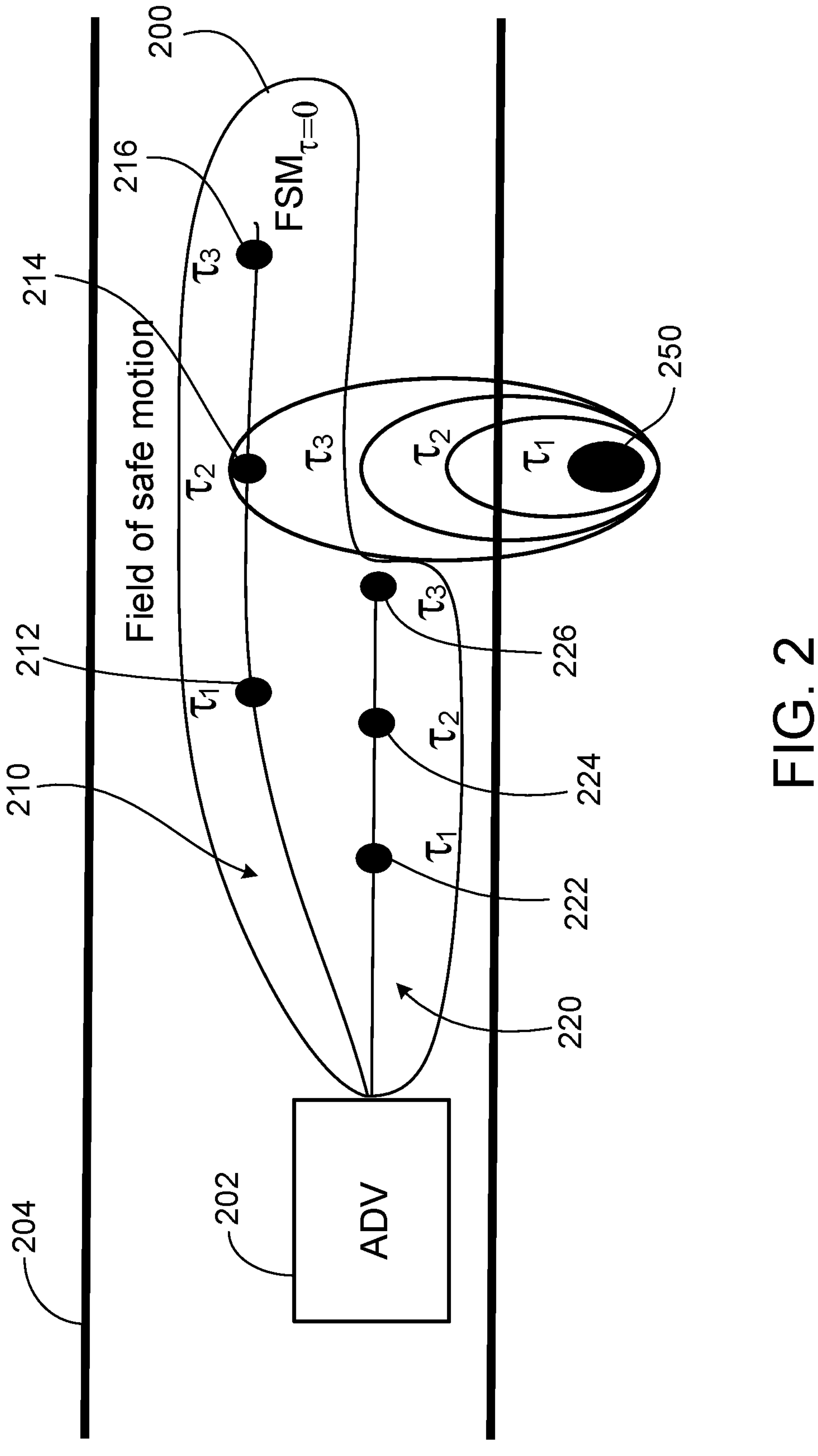
FIG. 2 is a diagram of an example field of safe motion.

FIG. 2 is a diagram of an example field of safe motion 200 that encompasses trajectory 210 and trajectory 220. FIG. 2 shows the field of safe motion 200 for the ADV 202 at timestep T=0 on the road 204. The ADV 202 is an example ego agent.

Each of the trajectories in the field of safe motion 200 can represent a path through one or more reachable states at future timesteps. For example, the trajectory 210 includes the reachable state 212 at timestep t=1, the reachable state 214 at timestep t=2, and the reachable state 216 at timestep 1=3. The trajectory 220 includes the reachable state 222 at timestep τ=1, the reachable state 224 at timestep τ=2, and the reachable state 226 at timestep τ=3.

FIG. 2 also shows another agent in the environment of the ADV 202, a pedestrian 250. FIG. 2 shows the predicted occupancy fields for the pedestrian 250 at timesteps τ=1, τ=2, and τ=3 (depicted in FIG. 2 as ovals).

A system such as the system 100 described above can generate the trajectory 210 and the trajectory 220. For example, the system can generate the trajectories so that they are kinematically possible for the ADV 202. That is, the system can take into account properties of the ADV in determining the trajectories. For example, the system can take into account action capabilities and perceptual capabilities of the agent, including response latencies of the ADV 202, to determine reachable states at future timesteps. Different types of vehicles, such as passenger vehicles and trucks, have different action capabilities and perceptual capabilities. For example, the system can take into account the maximum speed, acceleration, and turning capabilities of the ADV 202 to determine what positions in the environment can be reached by the ADV 202 at timesteps τ=1, τ=2, and τ=3. Action capabilities may also differ for the same ADV 202 based on environmental conditions such as road friction and grade.

The system can also generate the trajectories so that they do not overlap with the predicted occupancy fields of other agents in the environment. For example, the trajectory 210 and the trajectory 220 do not overlap with the occupancy fields for the pedestrian 250 at the same timestep.

The system can also generate the trajectories so that they do not violate other constraints such as social norms and road rules. For example, the trajectories 210 and 220 keep the ADV 202 on the road and under the speed limit.

The example FSM 200 thus includes a set of kinematically possible and acceptable trajectories at a given moment in time, conditioned on properties of the ADV 202. As described with reference to FIGS. 1 and 3, the trajectories of the FSM 200 can also be influenced by the uncertainty about the current and future states of the ADV 202, road geometry, location of static obstacles, uncertainty in perceptual capabilities of the agent, uncertainty in action capabilities of the agent, uncertainty in behaviors of other agents, and/or a prediction from a model.

Figure 3:
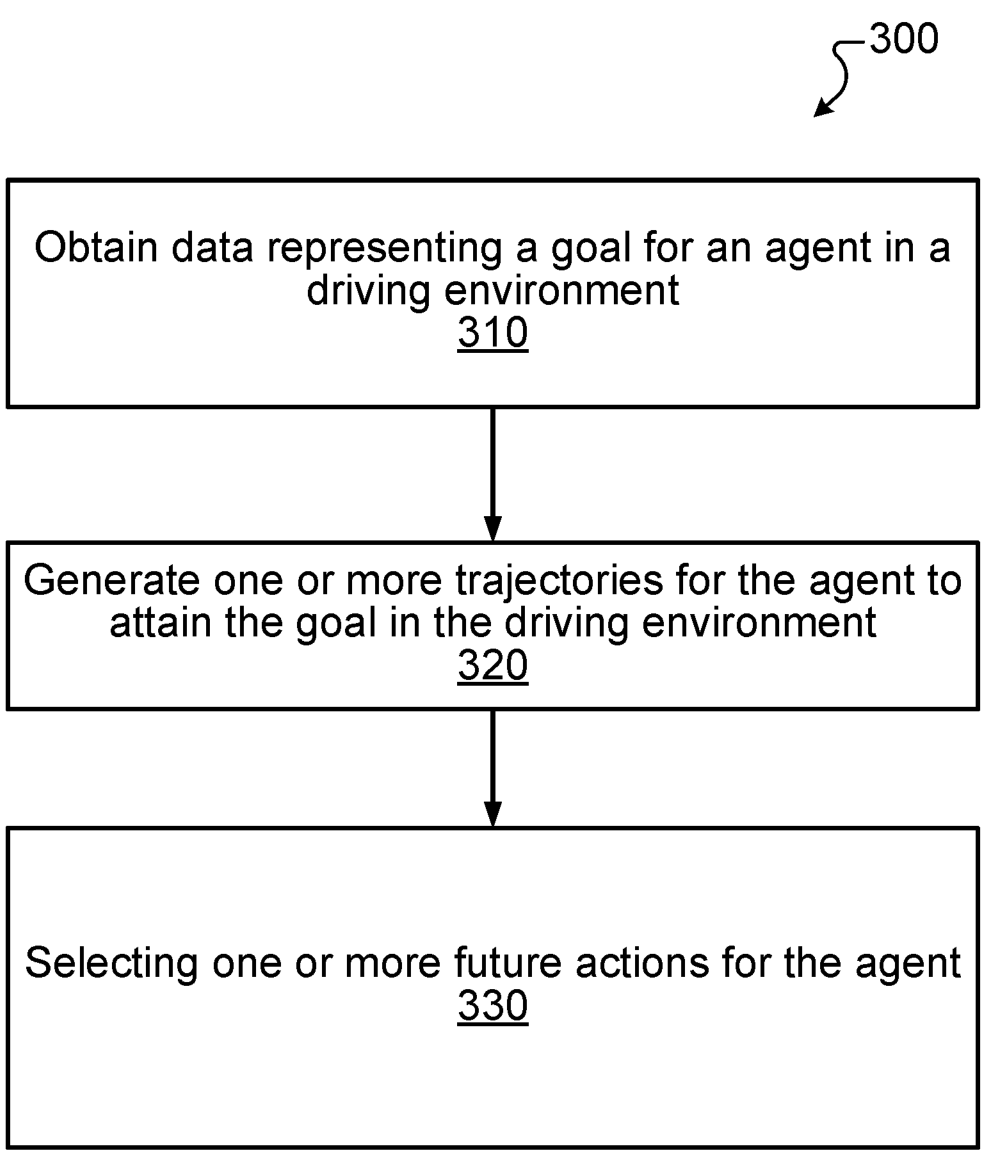
FIG. 3 is a flowchart of an example process for selecting one or more future actions for an agent.

FIG. 3 is a flowchart of an example process 300 for selecting one or more future actions for an agent. For convenience, the process 300 will be described as being performed by a system of one or more computers located in one or more locations. For example, an on-board system, e.g., the on-board system 100 of FIG. 1, appropriately programmed in accordance with this specification, can perform the process 300.

The system obtains data representing a goal for an agent in a driving environment (310). The goal can represent a progress goal such as a destination, for example, using spatial coordinates. The progress goal can also represent a timing requirement, such as reaching a destination as quickly as possible. The goal can also represent preferences for the agent, such as preferred states and/or observations, safety preferences, or driving preferences. The preferences can include excitatory factors such as maintaining a speed close to the speed limit. The preferences can also include inhibitory factors such as keeping in the center of a driving lane, avoiding hard braking, avoiding collisions, avoiding occupancy fields of other agents, and staying on the road. The preferences can also include preferences for comfort. For example, the preferences can include comfort thresholds such as a lateral acceleration comfort threshold or a lateral deceleration comfort threshold.

The system generates one or more trajectories for the agent to attain the goal in the driving environment (320). Each of the trajectories includes one or more actions.

The trajectories can be encompassed by an FSM. In some implementations, the system can use the FSM for offline analysis. For example, the system can evaluate whether an observed agent is driving in a desirable (e.g., collision-free, conflict-free) manner by determining whether the trajectories taken by the agent are within the FSM for each timestep of a driving scenario. The system can also determine whether the trajectories taken by the ego agent influenced the FSMs for other agents in unexpected ways.

For example, the system can determine the trajectories by one or more of: road geometry, location of static obstacles, action capabilities of the agent, perceptual capabilities of the agent, road rules, social norms, uncertainty in perceptual capabilities of the agent, uncertainty in action capabilities of the agent, uncertainty in behaviors of other agents, or a prediction from a model.

Examples of action capabilities of the ego agent include a braking capability, positive acceleration capability, or a swerving capability of the ego agent. Action capabilities of the ego agent can be determined by one or more of a size, a shape, or a mass of the agent. For example, an ego agent that is a truck has a different size, shape, and mass than an agent that is a passenger vehicle. Thus, the braking capability, positive acceleration capability, and swerving capability of the truck and the passenger vehicle are different.

The action capabilities of the ego agent can also be determined by one or more of a road friction, a road grade, or environmental conditions of a location of the ego agent. An ego agent may have different action capabilities in different environmental conditions. For example, the braking capability, positive acceleration capability, and swerving capability of a passenger vehicle may be different in different weather conditions, on different inclines, or on different types of roads.

Uncertainty in action capabilities of the ego agent can include motor noise, or limited precision in vehicle control actions. Uncertainty in action capabilities of the ego agent can also be due to incomplete knowledge about the action capabilities of the ego agent.

The perceptual capabilities of the ego agent can include properties such as perceptual range and type of sensors available such as visual light or laser light.

Uncertainty in perceptual capabilities of the ego agent may be due to sensory or perceptual limitations such as reduced visibility, visual occlusions, or a limited field of view.

In some implementations, one or more of the action and/or perceptual capabilities of the ego agent are assumed or predetermined. For example, for a particular vehicle, the braking capability of the ego agent in particular environmental conditions can be predetermined. In some implementations, one or more of the action and/or perceptual capabilities of the ego agent are determined, for example, using a learned model.

In some examples, the system can also determine the trajectories using spatial assumptions. For example, spatial assumptions can describe areas of a particular driving scenario that are reasonably excluded from the ego agent's possible trajectories. For example, if the ego agent is driving next to another agent in a neighboring lane, the spatial assumptions may include that neither agent will cross over to the neighboring lane, even though both agents are kinematically capable of doing so. In some implementations, one or more spatial assumptions are assumed or predetermined. For example, spatial assumptions can be predetermined for different scenarios and types of agents. In some implementations, one or more spatial assumptions are determined, for example, using a learned model.

In some implementations, the system can determine the trajectories using a model. The model can be a machine learning model learned from data, for example. For example, the model can be configured to generate a set of available trajectories for a given agent. As an example, the system can use the model 160 described above with reference to FIG. 1.

In some implementations, the system can determine the trajectories within the FSM based on predicted trajectories for agents in the environment that are conditional on the ego agent's trajectory. For example, the model can be trained to generate joint predictions for the ego agent and other agents.

In some implementations, the system can determine the trajectories within the FSM based on predicted occupancy fields for agents in the environment that are conditional on the ego agent's actions. For example, the predicted occupancy fields for other agents can take into account the ego agent's actions. The system can thus determine trajectories within the FSM that would result if the other agents respond in a likely or reasonably foreseeable manner to the ego agent's action. As an example, the system can determine the trajectories within the FSM using conditional heatmaps. In some examples, the system can determine the trajectories within the FSM using counterfactual reasoning.

In some examples, the system can determine the trajectories within the FSM based on predicted occupancy fields for agents in the environment. For example, the system can include a model that is configured to generate predictions of future occupancy fields of agents. For example, the system can use the occupancy field generation system 150 described above with reference to FIG. 1.

Uncertainty in the behaviors of other agents include ambiguous or erratic behavior indicating multiple possible future trajectories for the other agents.

In some examples, each trajectory is generated based on a window of one or more previous states of the ego agent before a current state of the ego agent. For example, the system can determine road geometry, location of static obstacles, action capabilities of the ego agent, and perceptual capabilities of the ego agent using data derived from sensor data from previous timesteps.

In some examples, the one or more trajectories also adhere to norms, such as legal or social norms, of the driving environment. The norms of the driving environment thus constrain trajectories that are legal or socially acceptable.

In some implementations, the system can determine the trajectories to take into account safety. For example, the trajectories can adhere to safety guidelines. For example, a safe trajectory can be defined as a conflict-free trajectory. A conflict-free trajectory can be operationalized as a trajectory where the longitudinal and lateral acceleration or the spatial proximity of the ego agent to other objects do not cross (exceed or fall below) a set of defined threshold values. As another example, a safe trajectory can be defined as a collision-free trajectory. A collision-free trajectory is a trajectory where the ego agent and another object do not collide.

Each of the trajectories includes one or more candidate actions. For example, the first actions of each of the trajectories can be a candidate action. Each of the candidate actions has an associated pragmatic value and epistemic value.

Among multiple candidate actions, a pragmatic action is an action having a maximum pragmatic value. Among multiple candidate actions, an epistemic action is an action having a maximum epistemic value. For example, performing the epistemic action would result in increasing an observed FSM, by increasing the number of trajectories encompassed by the observed FSM, more than other actions in the multiple candidate actions.

The system selects one or more future actions for the agent (330). That is, the system determines which trajectory of the available trajectories is optimized between an epistemic value that represents the degree of information to be gained about the driving environment and a pragmatic value that represents the degree to which the agent will advance toward the goal. For example, some of the available trajectories may have higher pragmatic value, i.e., end in a reachable state that leaves the agent closer to the goal, than other available trajectories.

As an example, the system can determine the epistemic value for each trajectory by scoring how much the trajectory has the potential to change the ego agent's beliefs about the preferences of the goal. For example, the system can obtain information that may update occupancy fields of the ego agent and/or other agents in the environment. The occupancy fields represent the ego agent's belief about where other agents may be in future timesteps. For example, FIG. 6B shows an example of a trajectory with higher epistemic value than in FIG. 6A.

The system can determine the pragmatic value for each trajectory by scoring how much the trajectory aligns with the preferences of the progress. For example, the system can use a preference function to score how well the trajectory aligns to the preferences such as maintaining a speed near the speed limit or avoiding overlap with occupancy fields of other agents in the environment.

The system selects one or more actions based on the trajectory that is optimized between the epistemic value and the pragmatic value. In some examples, the system executes the first action of the selected trajectory. In some examples, the system can backtrack through the counterfactual journey that led to the end state of the selected trajectory to determine the first action of the trajectory for execution.

The trajectory that is optimized between the epistemic value and the pragmatic value has a highest combined epistemic value and pragmatic value out of the trajectories. For example, the system can calculate a score for each trajectory derived from the epistemic value and the pragmatic value for the trajectory. For example, the score can be the negative sum of the epistemic value and the trajectory. The system can determine that the trajectory with the best, or lowest score, of the scores for the trajectories, is the trajectory that is optimized. In some examples, the epistemic value and pragmatic value for a trajectory can be combined differently such that the trajectory that is optimized has a highest score out of the trajectories within the FSM.

In some implementations, selecting one or more actions for the agent includes determining that at least one of the available trajectories avoids an occupancy field of another agent. The system selects the trajectory that avoids the occupancy field of the other agent. In some implementations, selecting one or more actions for the agent includes determining that movements of the other agent have removed all trajectories from the field of safe motion. In response, the system executes a defensive adjustment. Examples of defensive adjustments include performing actions such as pausing movement of the ego agent or slowing down to increase the distance to other agents.

In some implementations, selecting one or more actions includes determining that movements of the ego agent have removed all trajectories from the field of safe motion. In response, the system executes a defensive adjustment. Examples of defensive adjustments include performing actions such as pausing movement of the ego agent or slowing down to increase the distance to other agents.

In some implementations, selecting one or more actions for the agent includes determining that there are no trajectories in the field of safe motion within a future window of time. In response, the system performs a defensive adjustment.

In some examples, in response to determining that there are no trajectories in the field of safe motion, the system can perform an epistemic action, such as slowing down, to potentially create a field of safe motion at the next timestep.

As a particular example, the system can use active inference to determine which trajectory is optimized. The system estimates the free energy associated with trajectories within a defined planning time horizon. At each timestep, the system selects the trajectory that has the lowest expected free energy (EFE). As an example, the expected free energy for a trajectory can be defined as a negative sum of a pragmatic value and an epistemic value:

$$EFE = G(\pi) = -\underbrace{\mathbb{E}_{Q(o|\pi)}[\log(P(o)]}_{\text{Pragmatic value}} - \underbrace{\mathbb{E}_{Q(s,o|\pi)} D_{KL}[Q(s|o, \pi)\|Q(s|\pi)]}_{\text{Epistemic value}}$$

where $\pi = a_{1:H}$ is a trajectory, E denotes expectations, $s = s_{1:H}$ and $o = o_{1:H}$ are sequences of future states and observations up to a planning time horizon H. $Q(s|\pi)$ and $Q(o, s|\pi)$ are the agent's belief about future state and state-observation sequences, respectively. The beliefs are propagated forward in time from the current belief based on a state transition model.

The pragmatic value is defined based on a prior probability distribution over observations that is biased such that observations preferred by the agent have the highest probability and the highest pragmatic value. The preferences P(o) define the observations that the agent seeks to achieve through action, such as maintaining a speed near the speed limit.

The epistemic value is defined as the expected KL-divergence between the agent's prior and posterior beliefs about external states associated with the trajectory, corresponding to expected Bayesian Surprise. The epistemic value is thus maximized for observations that lead to a maximum change in beliefs. The epistemic value can also be expressed as the difference between the posterior predictive entropy and the expected ambiguity. In uncertain situations, minimizing expected free energy promotes trajectories with high epistemic value.

The system thus selects a trajectory based on the agent's beliefs over hidden states Q(s) and preferences defined as priors over observations P(o).

After determining the EFE for each trajectory, the action for the next timestep is sampled from a distribution of the first actions in the trajectories with the lowest EFEs. The system executes the action, and the current state changes.

The system uses a generative model which includes a state transition distribution and an observation distribution to obtain new observations. The agent's beliefs are updated into posterior beliefs based on the new observations. For example, the system can update beliefs by minimizing the variational free energy of the generative model.

The generative model is a statistical model of how states in the world generate observations. The generative model predicts the future behavior of other agents, and also how the agent's own actions (e.g., accelerating, steering, braking) affects future observations including the behavior of other agents (i.e., joint predictions). For example, the generative model can be represented as a discrete-time Partially Observable Markov Decision Process (POMDP) which describes how environment states, such as the state of the agent, evolve over time, depending on the agent's chosen trajectories and resulting actions. The generative model also generates signals observed by the agent, or observations, such as the presence of another agent.

Under active inference, goals such as "inhibitory" factors such as avoiding hard braking, collisions and road departures, are generally represented in terms of preferred observations or states. For a road user agent, this preferred observation/state may conceptually be characterized as "I'm making safe progress towards the destination while avoiding harmful events and respecting rules of the road and other social norms". According to active inference, the agent's behavior can then be explained by the mandate to generate observations that confirm this preferred state, which is equivalent to maximizing the evidence for its generative model or minimizing surprise. In the FSM framework, a preferred state can be satisfied by the state of maintaining an FSM at each timestep.

Surprise can be defined as deviations of observations from those predicted by the generative model. Thus, surprise indicates deviations from the preferred state that need to be protected against or corrected if they do occur. Surprising violations to the preferred state may be avoided by exhibiting caution, for example keeping a sufficient distance to other road users. When a surprising event does occur, it mandates a response to eliminate the surprise and restore the preferred state. The response can be of multiple types: updating the generative model prediction to align with the observation, or bringing observations of the world in line with the prediction (preferences). For example, a slower vehicle unexpectedly changing lanes in front of the ego agent may require a braking action from the ego agent to restore the preferred driving state. However, if the other agent is changing lanes at a higher speed no braking action may be necessary, only an update of the other agent's predicted future path.

As another example, an observed deviation from expected progress can generate surprise, for example when the observed speed is lower than the preferred speed. Surprise can be eliminated by increasing speed or changing the expected progress (preferred speed) to align with the observed speed.

Uncertainty in the generative model predictions may be related to unpredictable behavior of other agents, visibility limitations (occlusions, darkness, fog, etc.), and the ego agent's own control error (e.g., actuator noise, uncertain braking capabilities due to varying road surface conditions). Uncertainty implies an increased risk for experiencing surprise. In uncertain situations, minimizing the risk for surprising deviations from the preferred state (i.e., making safe progress) thus amounts to reducing uncertainty (the risk of being surprised) by gaining information through epistemic action and/or maintaining sufficient safety margins to protect against surprising events. In the FSM framework, as an example, increased uncertainty about another agent's future behavior (e.g., a cyclist behaving erratically) would be represented in terms of a larger occupancy field for that agent.

Surprise minimization can be achieved by updating the generative model state (predictions) by minimizing expected free energy.

The FSM can thus be used to conceptualize and operationalize the agent's preferred state (i.e., making safe progress towards the goal while avoiding harmful events and respecting rules of the road and other social norms). The system can thus select trajectories and actions according to the mandate to maintain an FSM with one or more available trajectories while making progress towards the destination. For a given ego agent with a set goal, defined perceptual and action limitations, and a given generative model, the mandate to maintain an FSM allows the system to select a driving plan towards the destination, defined by a combination of pragmatic and epistemic behavior. Thus, under the FSM framework, the preference functions in active inference are implicitly defined by the goal and the FSM itself.

From the updated beliefs, the system generates a new set of candidate trajectories over the planning horizon. The system selects a new trajectory out of the new candidate trajectories by selecting the trajectory that has the lowest EFE as described above.

In some examples, the system performs approximate belief update and trajectory selection using a particle filter and a particle planner. The system can represent uncertainty about hidden states using an ensemble of hypothetical states. The system selects the best trajectories by simulating future state-action-observation trajectories using a forward dynamics model and scores each trajectory for EFE.

For example, the system can represent beliefs over all state variables using a set of N particles. Upon executing an action and receiving a new observation, the system updates the set of particles. For example, the system can use a Sequential Importance Resampling (SIR) filter to update its belief over states. The system can evaluate the EFE of a trajectory under a particular belief by propagating the belief particles to compute the state and observation distributions at each counterfactual future timestep and using the propagated particles to evaluate the pragmatic and epistemic values.

Active inference is described in more detail in "Resolving uncertainty on the fly: Modeling adaptive driving behavior as active inference" by Johan Engström, Ran Wei, Anthony McDonald, Alfredo Garcia, Matt O'Kelly, and Leif Johnson (2024), Frontiers in Neurorobotics, 21 Mar. 2024 Volume 18-2024|https://doi.org/10.3389/fnbot.2024.1341750, which is herein incorporated by reference.

Figure 4A:
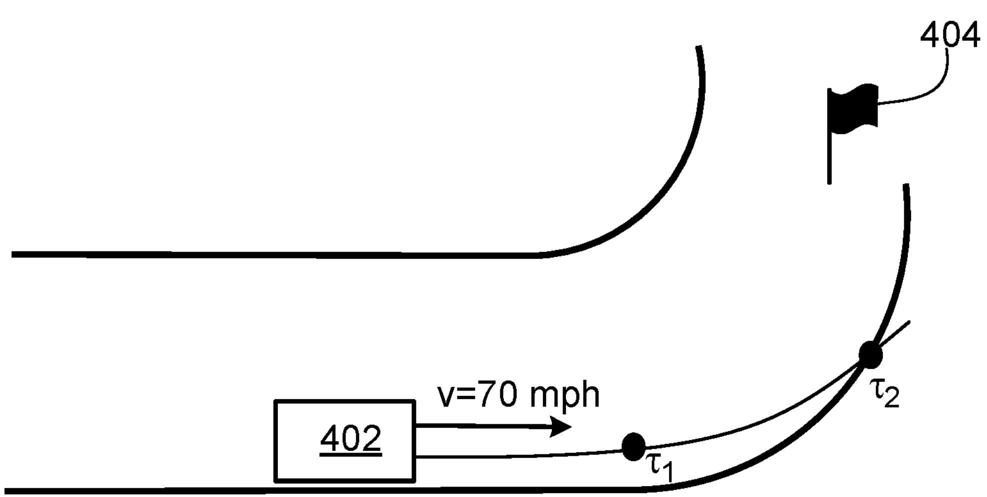
FIGS. 4A-4B are diagrams that illustrate selecting one or more example future actions.
Figure 4B:
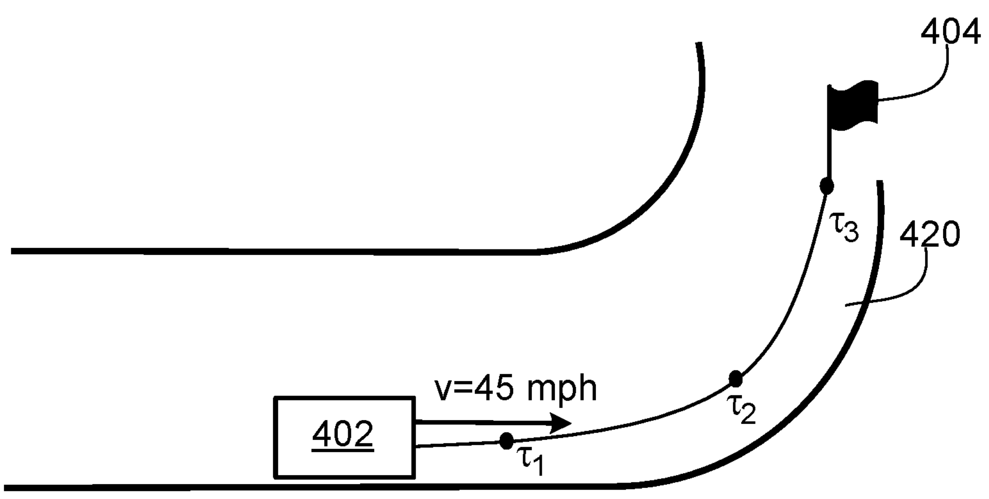

FIGS. 4A-4B are diagrams that illustrate selecting one or more example future actions. In FIGS. 4A-4B, $t_n$ represents the current timestep and $\tau_n$ represents timesteps in the future relative to $t_n$. For example, $\tau_1$ represents 1 timestep in the future, $\tau_2$ represents 2 timesteps in the future, and $\tau_3$ represents 3 timesteps in the future.

FIGS. 4A-4B show an ego agent 402 with a goal 404. The ego agent 402 can be the vehicle 102 described above with reference to FIG. 1, for example. The goal 404 can be to arrive at a particular location as quickly as possible.

A system on board the ego agent 402 such as the on-board system 100 described above with reference to FIG. 1 can determine trajectories within a field of safe motion for the ego agent 402 at $t_n$. In the example of FIGS. 4A-4B, the system can determine the trajectories using the current state of the ego agent 402 (position, speed, acceleration, etc.), the road geometry, and the action capabilities of the ego agent 402 (friction limits for braking and swerving).

FIGS. 4A-4B show the ego agent 402 approaching a curve at a given speed. For example, FIG. 4A shows the ego agent 402 approaching the curve at 70 miles per hour. Due to the high speed of the ego agent 402, there are no trajectories available to the ego agent 402 to maintain the curvature required to stay on the road, for example, due to friction limits on maximum lateral acceleration. In FIG. 4A, there are no trajectories in the field of safe motion. In response, the system can execute a defensive adjustment.

FIG. 4B shows the ego agent 402 approaching the curve at 45 miles per hour. In this example, the system selects driving plans to ensure that at least one trajectory exists in the field of safe motion at every timestep. Thus the system maintains a lower entry speed according to the action capabilities, such as the lateral friction limits, of the ego agent 402. The system determines that the field of safe motion includes a trajectory 420 that safely leads to the goal 404 while maximizing progress. The system can thus select the trajectory 420 as the driving plan.

In some examples, the system can also determine the trajectories within the FSM based on uncertainty in the action capabilities of the ego agent 402, such as due to varying road surface conditions and/or control errors. In these examples the system may use a larger safety margin and the trajectories within the FSM may be implemented by actions that indicate a lower speed than 45 miles per hour.

Figure 5A:
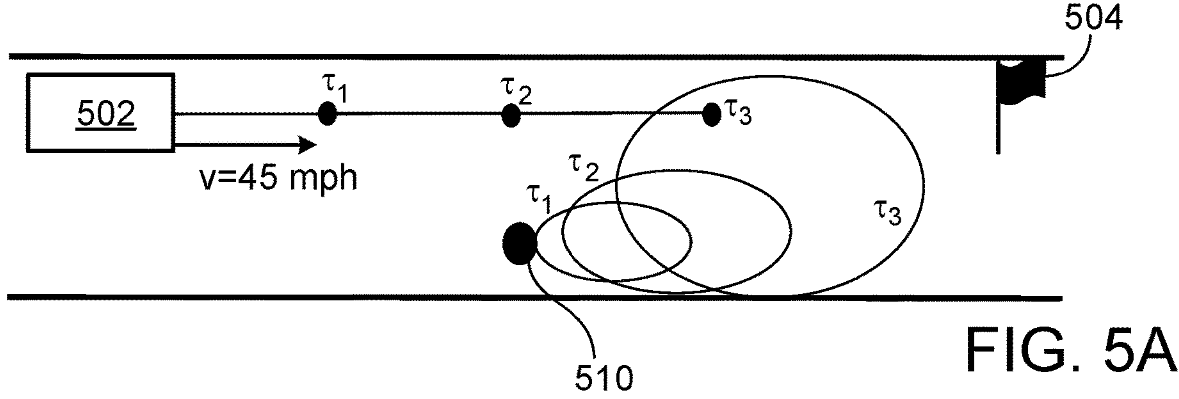
FIGS. 5A-5C are diagrams that illustrate selecting one or more example future actions.
Figure 5B:
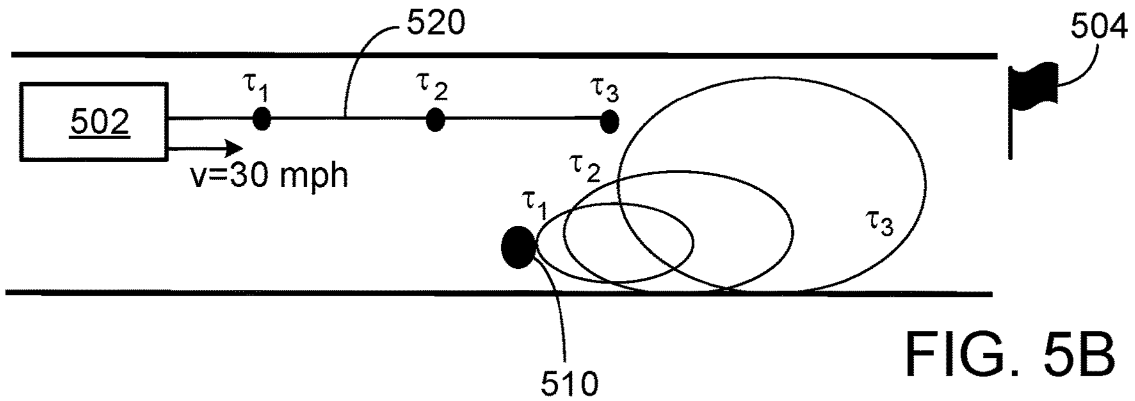
Figure 5C:
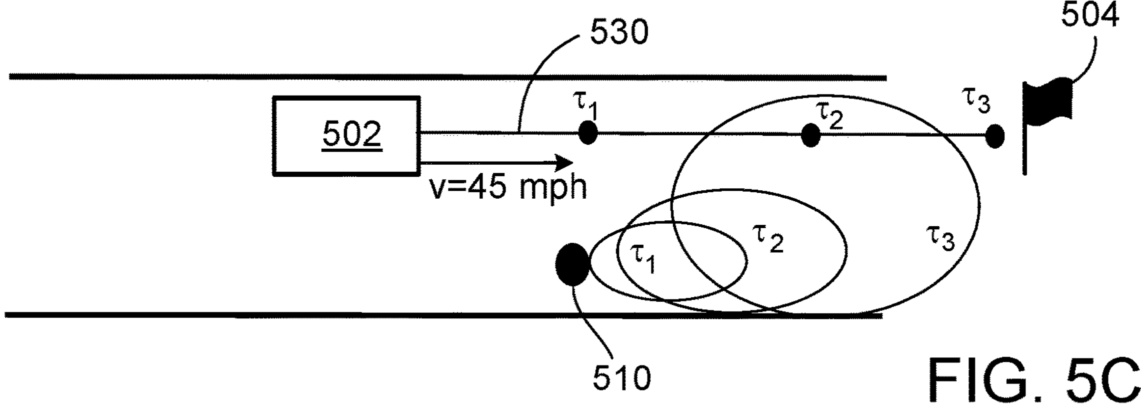

FIGS. 5A-5C are diagrams that illustrate selecting one or more example future actions. In FIGS. 5A-5C, $t_n$ represents the current timestep and $\tau_n$ represents timesteps in the future relative to $t_n$. For example, $\tau_1$ represents 1 timestep in the future, $\tau_2$ represents 2 timesteps in the future, and $\tau_3$ represents 3 timesteps in the future.

FIGS. 5A-5C show an ego agent 502 with a goal 504. The ego agent 502 can be the vehicle 102 described above with reference to FIG. 1, for example. The goal 504 can be to arrive at a particular location as quickly as possible.

A system on board the ego agent 502 such as the on-board system 100 described above with reference to FIG. 1 can determine trajectories within a field of safe motion for the ego agent 502 at $t_n$. In the example of FIGS. 5A-5C, the system can determine the trajectories within the field of safe motion using predicted occupancy fields of another agent such as the cyclist 510 (depicted in FIGS. 5A-5C as ovals), the current state of the ego agent 502 (position, speed, acceleration, etc.), the road geometry, and the action capabilities of the ego agent 502 (braking and accelerating). FIGS. 5A-5C show that the predicted occupancy fields, which represent uncertainty about the future position of the cyclist 510, increase in size over time.

FIGS. 5A-5C show the ego agent 502 approaching a slower-moving cyclist 510 on a narrow road which does not have enough room for increasing lateral separation during an overtake.

FIG. 5A shows the ego agent 502 approaching the cyclist 510 at 45 miles per hour at to. Due to the high speed of the ego agent 502, there are no trajectories in the field of safe motion available to the ego agent 502 because all trajectories overlap with the predicted occupancy field of the cyclist 510 at $\tau_3$.

FIG. 5B shows the ego agent 502 approaching the cyclist at 30 mph at to. In this example, the system selects driving plans to ensure that at least one trajectory exists in the field of safe motion at every timestep. Thus the system maintains a lower entry speed to maintain one or more trajectories within the FSM, which includes trajectory 520. However, the slower entry speed will not allow the ego agent 502 to overtake the cyclist 510 and arrive at the goal 504 as quickly as possible. In addition, if the ego agent 502 continues at 30 miles per hour, the ego agent 502 may still overlap with the predicted occupancy field of the cyclist 510 in the future.

FIG. 5C shows the ego agent 502 approaching the cyclist 510 at 45 miles per hour at $t_1$ after initially closing in at 30 miles per hour as in FIG. 5B. The system determines that the field of safe motion, after getting closer to the cyclist 510 through executing trajectory 520, includes a trajectory 530 that safely leads to the goal 504 while maximizing progress. Thus the ego agent 502 passes by the cyclist at 12 before the cyclist 510 potentially occupies the path of the ego agent 502 at $\tau_3$. The system can thus select trajectory 530 as the driving plan.

Executing trajectory 520 at to can be seen as an epistemic action that puts the ego agent 502 in a position sufficiently close to the cyclist 510 at $t_1$, and enables one or more trajectories likely to be within a field of safe motion towards the goal 504.

In some examples, the system can also determine the trajectories within the FSM based on comfort thresholds or social norms which may prevent using extreme accelerations during overtaking.

Figure 6A:
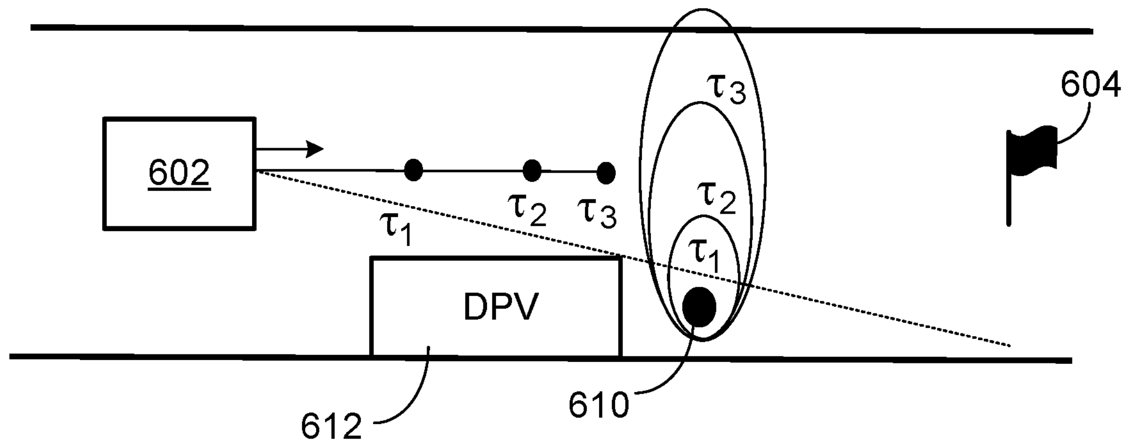
FIGS. 6A-6B are diagrams that illustrate selecting one or more example future actions.
Figure 6B:
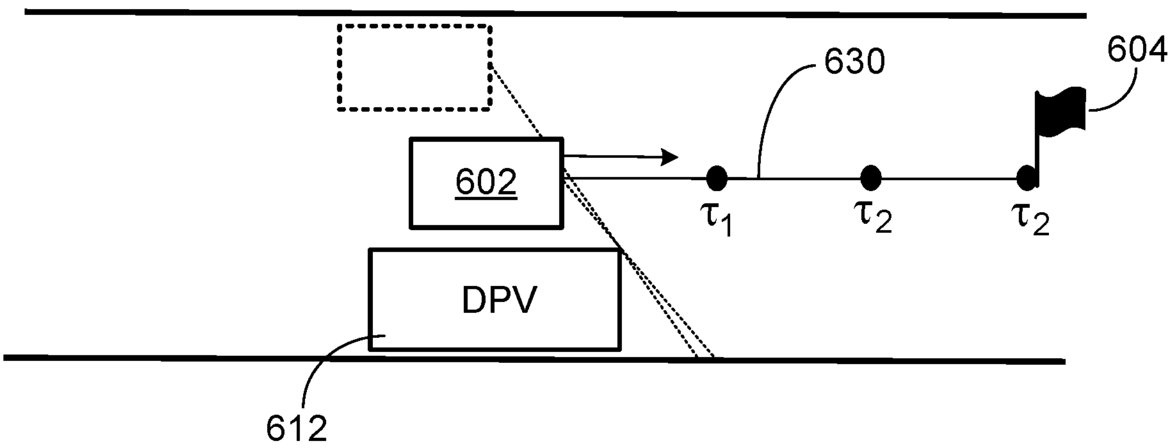

FIGS. 6A-6B are diagrams that illustrate selecting one or more example future actions. In FIGS. 6A-6B, $t_n$ represents the current timestep and $\tau_n$ represents timesteps in the future relative to $t_n$. For example, $\tau_1$ represents 1 timestep in the future, $\tau_2$ represents 2 timesteps in the future, and $\tau_3$ represents 3 timesteps in the future.

FIGS. 6A-6B show an ego agent 602 with a goal 604. The ego agent 602 can be the vehicle 102 described above with reference to FIG. 1, for example. The goal 604 can be to arrive at a particular location as quickly as possible.

A system on board the ego agent 602 such as the on-board system 100 described above with reference to FIG. 1 can determine trajectories within a field of safe motion for the ego agent 602 at $t_n$. In the example of FIGS. 6A-6B, the system can determine the trajectories within the field of safe motion using predicted occupancy fields (depicted as ovals in FIG. 6A) of another agent such as a potential pedestrian 610 hidden behind a double parked vehicle DPV, the current state of the ego agent 602 (position, speed, acceleration, etc.), the road geometry, the location of static objects such as the DPV 612, and the action capabilities of the ego agent 602 (braking and accelerating).

FIG. 6A shows the ego agent 602 approaching the DPV 612 at to. The system takes into account uncertainty related to potential objects or agents that may be hidden behind the occluding DPV. The dotted line shown in FIG. 6A shows the line of sight of the ego agent 602, and shows that the potential pedestrian 610 may be hidden behind the DPV 612. Due to the predicted occupancy fields of the potential pedestrian 610, there are no trajectories in the field of safe motion available to the ego agent 602 because all trajectories overlap with the predicted occupancy field of the potential pedestrian 610 at $\tau_2$. In response, the system can perform a defensive adjustment and/or epistemic action.

For example, the defensive adjustment can be slowing down to ensure that the ego agent 602 can stop short of the potential pedestrian 610. FIG. 6B shows the ego agent 602 passing by the DPV 612 at $t_1$ at the slower speed. The system now has a clear sight of the area behind the DPV 612, and can eliminate the uncertainty about potential pedestrians hidden behind the DPV 612. The system determines that the field of safe motion, after eliminating the uncertainty about potential pedestrians, includes a trajectory 630 that safely leads to the goal 604 while maximizing progress. The system can thus select trajectory 630 as the driving plan.

As another example, the defensive adjustment can be moving to the left lane to enable a line of sight to the area hidden behind the DPV 612 earlier. Although the pragmatic value of this action may be lower than slowing down because the ego agent 602 is in another lane than the goal 604, the epistemic value of this action may be higher. The dotted lines in FIG. 6B show that the line of sight of the ego agent 602 in the left lane extends to part of the area previously hidden by the DPV 612 in FIG. 6A. The system now has a clearer sight of the area behind the DPV 612, and can eliminate the uncertainty about potential pedestrians hidden behind the DPV 612 earlier. The system determines that the field of safe motion, after eliminating the uncertainty about potential pedestrians, includes a trajectory that safely leads to the goal 604 more quickly than trajectory 630.

Figure 7A:
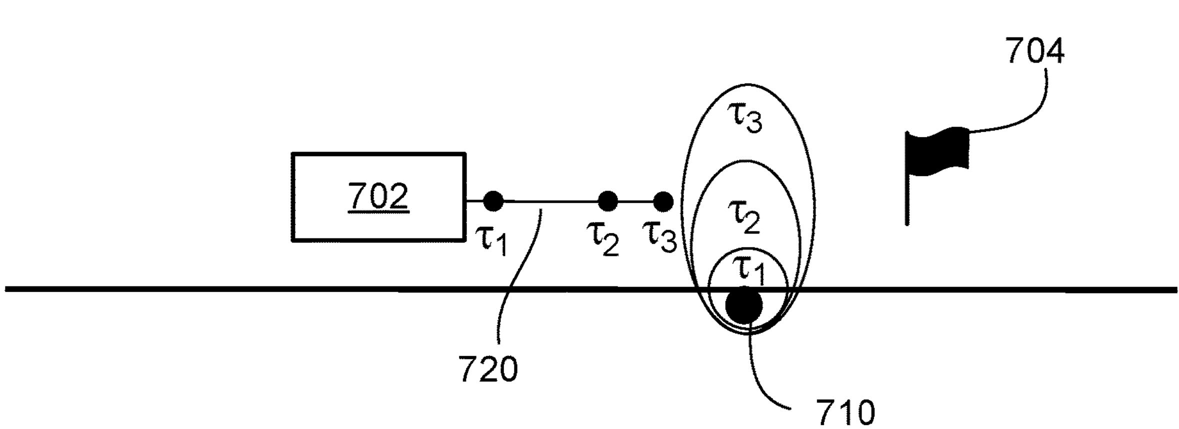
FIGS. 7A-7B are diagrams that illustrate selecting one or more example future actions.
Figure 7B:
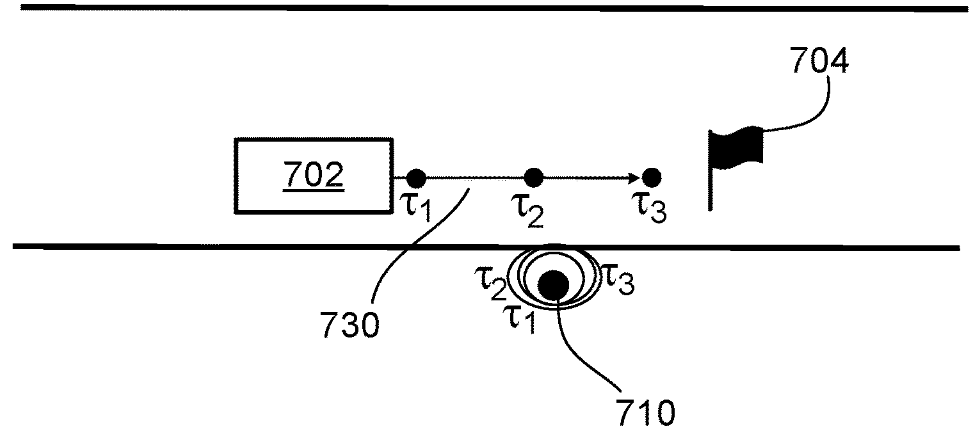

FIGS. 7A-7B are diagrams that illustrate selecting one or more example future actions. In FIGS. 7A-7B, $t_n$ represents the current timestep and $\tau_n$ represents timesteps in the future relative to $t_n$. For example, $\tau_1$ represents 1 timestep in the future, $\tau_2$ represents 2 timesteps in the future, and $\tau_3$ represents 3 timesteps in the future.

FIGS. 7A-7B show an ego agent 702 with a goal 704. The ego agent 702 can be the vehicle 102 described above with reference to FIG. 1, for example. The goal 704 can be to arrive at a particular location as quickly as possible.

A system on board the ego agent 702 such as the on-board system 100 described above with reference to FIG. 1 can determine trajectories within a field of safe motion for the ego agent 702 at $t_n$. In the example of FIGS. 7A-7B, the system can determine the trajectories within the field of safe motion using predicted occupancy fields of another agent such as a pedestrian 710 (depicted as ovals in FIGS. 7A-7B), the current state of the ego agent 702 (position, speed, acceleration, etc.), the road geometry, and the action capabilities of the ego agent 702 (braking and accelerating).

FIG. 7A shows the ego agent 702 approaching the pedestrian 710. The system takes into account uncertainty related to the pedestrian 710. For example, the system may be uncertain about the intent of the pedestrian 710 to cross the road. The system represents the uncertainty using larger predicted occupancy fields for the pedestrian 710. Due to the predicted occupancy fields of the pedestrian 710, the system determines that the field of safe motion includes trajectory 720. The trajectory 720 may require that the ego agent 702 slow down sufficiently to be able to stop if the pedestrian 710 crosses the road. The system can thus select trajectory 720 as the driving plan.

FIG. 7B shows an updated trajectory in the field of safe motion for the ego agent 702 after performing an epistemic action to clarify the intent of the pedestrian 710. For example, the system can communicate with the pedestrian 710, e.g., audio or visually, to clarify their intent. The system can reduce the uncertainty in their belief about the future behavior of the pedestrian 710, reflected in the smaller predicted occupancy fields for the pedestrian 710. The system can generate an updated trajectory within the field of safe motion using the updated uncertainty, trajectory 730, which enables a safe path to the goal 704. The system can thus select trajectory 730 as the driving plan. FIG. 7B shows that the system can determine the optimal way to communicate in different scenarios, i.e., determining the optimal combination of epistemic and pragmatic actions, using the trajectories.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, off-the-shelf or custom-made parallel processing subsystems, e.g., a GPU or another kind of special-purpose processing subsystem. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program which may also be referred to or described as a program, software, a software application, an app, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and pointing device, e.g., a mouse, trackball, or a presence sensitive display or other surface by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone, running a messaging application, and receiving responsive messages from the user in return.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer-implemented method comprising:

obtaining data representing a goal for an agent in a driving environment;

generating one or more available trajectories for the agent to attain the goal in the driving environment;

selecting one or more future actions for the agent, comprising:

for each of the one or more available trajectories, determining an epistemic value that represents the degree of information to be gained about the driving environment and a pragmatic value that represents the degree to which the agent will advance toward the goal;

determining a trajectory of the one or more available trajectories that is optimized between the epistemic value and the pragmatic value; and selecting the one or more future actions based on the trajectory that is optimized between the epistemic value and the pragmatic value; and causing the agent to execute the one or more future actions.

2. The method of claim 1, wherein selecting the one or more future actions for the agent comprises:

determining that at least one of the available trajectories avoids an occupancy field of another agent; and selecting the trajectory that avoids the occupancy field of the other agent.

3. The method of claim 1, wherein selecting the one or more future actions for the agent comprises:

determining that movements of another agent have removed all trajectories from a field of safe motion; and in response, executing a defensive adjustment.

4. The method of claim 1, wherein the trajectory that is optimized between the epistemic value and the pragmatic value has a highest combined epistemic value and pragmatic value out of the one or more available trajectories.

5. The method of claim 1, wherein each of the one or more available trajectories comprises a respective candidate action, and wherein a pragmatic action is an action having a maximum pragmatic value among the respective candidate actions.

6. The method of claim 5, wherein the respective candidate actions each have a respective associated pragmatic value and epistemic value.

7. The method of claim 1, wherein each of the one or more available trajectories comprises a respective candidate action, and wherein an epistemic action is an action having a maximum epistemic value among the respective candidate actions.

8. The method of claim 7, wherein the epistemic action results in increasing an observed field of safe motion (FSM) more than other respective candidate actions.

9. The method of claim 1, wherein the one or more available trajectories are determined by one or more of: road geometry, location of static obstacles, action capabilities of the agent, perceptual capabilities of the agent, road rules, social norms, uncertainty in one or more perceptual capabilities of the agent, uncertainty in one or more action capabilities of the agent, uncertainty in behaviors of other agents, or a prediction from a model.

10. The method of claim 9, wherein the action capabilities of the agent are determined by one or more of: a size, a shape, or a mass of the agent.

11. The method of claim 9, wherein the action capabilities include one or more of: a braking capability, a positive acceleration capability, or a swerving capability of the agent.

12. The method of claim 9, wherein the action capabilities of the agent are determined by one or more of: a road friction, a road grade, or environmental conditions of a location of the agent.

13. The method of claim 9, wherein the model is configured to generate predictions of future occupancy fields of agents.

14. The method of claim 9, wherein the model is configured to generate a set of available trajectories comprising the one or more available trajectories for the agent.

15. The method of claim 1, wherein each trajectory is generated based on a window of one or more previous states of the agent before a current state of the agent.

16. The method of claim 1, wherein upon determining that there are no trajectories in a field of safe motion within a future window of time, performing a defensive adjustment.

17. The method of claim 1, wherein the one or more available trajectories also adhere to norms of the driving environment.

18. The method of claim 17, wherein the norms of the driving environment constrain trajectories that are legal or socially acceptable.

19. The method of claim 1, wherein determining a trajectory of the one or more available trajectories that is optimized between the epistemic value and the pragmatic value comprises determining the trajectory of the one or more available trajectories that has a highest combined epistemic value and pragmatic value out of the one or more available trajectories.

20. A system comprising:

one or more computers; and one or more storage devices storing instructions that are operable, when executed by the one or more computers, cause the one or more computers to perform operations comprising:

obtaining data representing a goal for an agent in a driving environment;

generating one or more available trajectories for the agent to attain the goal in the driving environment;

selecting one or more future actions for the agent, comprising:

for each of the one or more available trajectories, determining an epistemic value that represents the degree of information to be gained about the driving environment and a pragmatic value that represents the degree to which the agent will advance toward the goal;

determining a trajectory of the one or more available trajectories that is optimized between the epistemic value and the pragmatic value; and selecting the one or more future actions based on the trajectory that is optimized between the epistemic value and the pragmatic value; and causing the agent to execute the one or more future actions.

21. One or more non-transitory storage media storing instructions that when executed by one or more computers cause the one or more computers to perform operations comprising:

obtaining data representing a goal for an agent in a driving environment;

generating one or more available trajectories for the agent to attain the goal in the driving environment;

selecting one or more future actions for the agent, comprising:

for each of the one or more available trajectories, determining an epistemic value that represents the degree of information to be gained about the driving environment and a pragmatic value that represents the degree to which the agent will advance toward the goal;

determining a trajectory of the one or more available trajectories that is optimized between the epistemic value and the pragmatic value; and selecting the one or more future actions based on the trajectory that is optimized between the epistemic value and the pragmatic value; and causing the agent to execute the one or more future actions.

* * * * *